(12) United States Patent
Zhang

(10) Patent No.: US 10,320,206 B2
(45) Date of Patent: *Jun. 11, 2019

(54) POWER ADAPTER, TERMINAL, AND METHOD FOR PROCESSING IMPEDANCE ANOMALIES IN CHARGING CIRCUIT

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 165 days.

This patent is subject to a terminal disclaimer.

(21) Appl. No.: 15/115,052

(22) PCT Filed: Jan. 9, 2015

(86) PCT No.: PCT/CN2015/070460
§ 371 (c)(1),
(2) Date: Jul. 28, 2016

(87) PCT Pub. No.: WO2015/113462
PCT Pub. Date: Aug. 6, 2015

(65) Prior Publication Data
US 2016/0344210 A1    Nov. 24, 2016

(30) Foreign Application Priority Data

Jan. 28, 2014  (CN) .......................... 2014 1 0042716
Jan. 28, 2014  (CN) .......................... 2014 1 0043148

(51) Int. Cl.
*H02J 7/00* (2006.01)
*H02J 7/02* (2016.01)
*H01R 31/06* (2006.01)

(52) U.S. Cl.
CPC ............ *H02J 7/0029* (2013.01); *H01R 31/06* (2013.01); *H02J 7/007* (2013.01); *H02J 7/0057* (2013.01);
(Continued)

(58) Field of Classification Search
CPC ........ H02J 7/0029; H02J 7/0057; H02J 7/007; H02J 7/02; H02J 7/0047; H02J 2007/0096;
(Continued)

(56) References Cited

U.S. PATENT DOCUMENTS 4,207,611 A    6/1980   Gordon
6,018,703 A    6/2000   Dodd
(Continued)

FOREIGN PATENT DOCUMENTS

CN    1163500 A    10/1997
CN    2678222 Y    2/2005
(Continued)

OTHER PUBLICATIONS

Translation of the International Search Report and Written Opinion corresponding to International Patent Application No. PCT/CN2015/070460, dated Apr. 3, 2015, 8 pages.
(Continued)

*Primary Examiner* — Richard Isla
*Assistant Examiner* — Mohammed J Sharief
(74) *Attorney, Agent, or Firm* — Lathrop Gage LLP

(57) ABSTRACT

A power adapter, a terminal, and a method for processing an impedance anomaly in a charging loop are provided. The terminal includes a battery and a charging interface, and is configured to form a charging loop with a power adapter via the charging interface to charge the battery. The terminal further includes: a communication component, configured to receive voltage indication information from the power
(Continued)

adapter when the power adapter charges the terminal, the voltage indication information indicating an output voltage of the power adapter; a detection component, configured to detect an input voltage of the power adapter; and an anomaly processing component, configured to determine whether an impedance of the charging loop is abnormal according to a difference between the input voltage and the output voltage, and to control the charging loop to enter into a protected state if the impedance of the charging loop is abnormal.

22 Claims, 3 Drawing Sheets

(52) U.S. Cl.
CPC ............... *H02J 7/02* (2013.01); *H02J 7/0047* (2013.01); *H02J 2007/0096* (2013.01)

(58) Field of Classification Search
CPC ...... H02J 7/0042; H02J 7/0045; H01R 31/06; Y02E 60/12; H01M 10/44; H01M 10/46
USPC ......................................................... 320/107
See application file for complete search history.

(56) References Cited

U.S. PATENT DOCUMENTS

| | | | |
|---|---|---|---|
| 6,829,726 | B1 | 12/2004 | Korhonen |
| 7,012,405 | B2 | 3/2006 | Nishida et al. |
| 7,376,846 | B2 | 5/2008 | Hawkins et al. |
| 7,459,884 | B2 | 12/2008 | Sasaki et al. |
| 7,649,550 | B2 | 1/2010 | Ishiyama |
| 7,737,590 | B2 | 6/2010 | Oyama |
| 8,064,513 | B2 | 11/2011 | Yamazaki |
| 8,624,719 | B2 | 1/2014 | Klose et al. |
| 9,337,919 | B2 | 5/2016 | Kikuchi |
| 9,379,558 | B2 | 6/2016 | Seethaler |
| 9,825,348 | B2 | 11/2017 | Kikuchi |
| 10,122,190 | B2 | 11/2018 | Zhang |
| 2002/0169915 | A1 | 11/2002 | Wu |
| 2002/0190755 | A1 | 12/2002 | Lee |
| 2004/0090209 | A1 | 5/2004 | Nishida et al. |
| 2004/0100271 | A1 | 5/2004 | Ikeda |
| 2004/0108843 | A1 | 6/2004 | Lanni |
| 2004/0164714 | A1 | 8/2004 | Hayashi |
| 2005/0174094 | A1* | 8/2005 | Purdy .................. H02J 7/0052 320/134 |
| 2006/0132087 | A1 | 6/2006 | Chen et al. |
| 2006/0284595 | A1 | 12/2006 | Hsieh et al. |
| 2008/0048621 | A1 | 2/2008 | Yun |
| 2008/0315846 | A1 | 12/2008 | Sato et al. |
| 2010/0077237 | A1 | 3/2010 | Sawyers |
| 2010/0141266 | A1 | 6/2010 | Cui et al. |
| 2011/0248670 | A1 | 10/2011 | Yamazaki et al. |
| 2011/0266874 | A1 | 11/2011 | Soemantri et al. |
| 2012/0098495 | A1 | 4/2012 | Yang et al. |
| 2012/0137026 | A1 | 5/2012 | Shen et al. |
| 2012/0253717 | A1* | 10/2012 | Ito ........................ G01R 31/362 702/63 |
| 2012/0268074 | A1 | 10/2012 | Cooley |
| 2013/0175978 | A1 | 7/2013 | Hsiao |
| 2015/0180244 | A1 | 6/2015 | Jung et al. |
| 2015/0197789 | A1 | 7/2015 | Rigatti et al. |
| 2016/0336767 | A1 | 11/2016 | Zane et al. |

FOREIGN PATENT DOCUMENTS

| | | |
|---|---|---|
| CN | 1691451 A | 11/2005 |
| CN | 2935489 Y | 8/2007 |
| CN | 101013764 A | 8/2007 |
| CN | 101102119 A | 1/2008 |
| CN | 101106283 A | 1/2008 |
| CN | 101123365 A | 2/2008 |
| CN | 101299544 A | 11/2008 |
| CN | 101363895 A | 2/2009 |
| CN | 201335870 Y | 10/2009 |
| CN | 101751316 A | 6/2010 |
| CN | 101938160 A | 1/2011 |
| CN | 201837695 U | 5/2011 |
| CN | 102082310 A | 6/2011 |
| CN | 201858546 U | 6/2011 |
| CN | 102122739 A | 7/2011 |
| CN | 201975834 U | 9/2011 |
| CN | 102395892 A | 3/2012 |
| CN | 102479137 A | 5/2012 |
| CN | 102481858 A | 5/2012 |
| CN | 102508096 A | 6/2012 |
| CN | 102593795 A | 7/2012 |
| CN | 102957193 A | 3/2013 |
| CN | 103135018 A | 6/2013 |
| CN | 103226183 A | 7/2013 |
| CN | 103236568 A | 8/2013 |
| CN | 103257699 A | 8/2013 |
| CN | 103269097 A | 8/2013 |
| CN | 103399251 A | 11/2013 |
| CN | 103477529 A | 12/2013 |
| CN | 203398103 U | 1/2014 |
| CN | 203398750 U | 1/2014 |
| CN | 203490636 U | 3/2014 |
| CN | 103762702 A | 4/2014 |
| CN | 203747451 U | 7/2014 |
| CN | 203747454 U | 7/2014 |
| CN | 204179074 U | 2/2015 |
| CN | 104393627 A | 3/2015 |
| CN | 204422727 U | 6/2015 |
| EP | 2701267 A1 | 2/2014 |
| JP | H08237947 A | 9/1996 |
| JP | H09168241 A | 6/1997 |
| JP | 2000134816 A | 5/2000 |
| JP | 200392841 A | 3/2003 |
| JP | 2007020256 A | 1/2007 |
| JP | 2007327772 A * | 12/2007 |
| JP | 2007327772 A | 12/2007 |
| JP | 2008035674 A | 2/2008 |
| JP | 2009195074 A | 8/2009 |
| JP | 2009225493 A | 10/2009 |
| JP | 2010220299 A | 9/2010 |
| JP | 2011015581 A | 1/2011 |
| JP | 4960022 B2 | 6/2012 |
| JP | 2012151946 A | 8/2012 |
| JP | 2013108793 A | 6/2013 |
| JP | 2013125745 A | 6/2013 |
| JP | 2013153595 A | 8/2013 |
| JP | 2015002068 A | 1/2015 |
| WO | WO 2009057187 A1 | 5/2009 |
| WO | 2012144032 A1 | 10/2012 |
| WO | WO 2012144032 A1 | 10/2012 |
| WO | WO 2015113349 A1 | 8/2015 |
| WO | WO 2015113463 | 8/2015 |

OTHER PUBLICATIONS

Office Action corresponding to European Patent Application No. 15742934.1, dated Sep. 29, 2017.
Office Action dated Sep. 29, 2017 in EP 15742934, 9 pp.
Korean Patent Application No. 2016-7022404, Office Action dated Nov. 10, 2017, 3 pp.
Korean Patent Application No. 2016-7022404, English Translation of Office Action dated Nov. 10, 2017, 3 pp.
Japanese Patent Application No. 2016-549266, Office Action dated Nov. 14, 2017, 3 pp.
Japanese Patent Application No. 2016-549266, English Translation of Office Action dated Nov. 14, 2017, 3 pp.
Japanese Patent Application No. 2016-549514 English translation of Office Action dated Apr. 10, 2018, 6 pages.
Japanese Patent Application No. 2016-549514 English translation of Notification of Reasons for Refusal dated Sep. 26, 2017, 4 pages.
Australian Patent Application No. 2015210565, Examination report dated May 10, 2017, 3 pages.
PCT/CN2015/070461 English translation of International Search Report and Written Opinion dated Mar. 27, 2015, 12 pages.

(56) References Cited

OTHER PUBLICATIONS

Chinese Patent Application No. 201580005413.1 English translation of Office Action dated Jul. 10, 2017, 10 pages.
Korean Patent Application No. 10-2016-7023552 English translation of Office Action dated Dec. 14, 2018, 5 pages.
Australian Patent Application No. 2014381139 Office Action dated Jul. 26, 2017, 3 pages.
Canadian Patent Application No. 2938139 Office Action dated Feb. 15, 2018, 5 pages.
Canadian Patent Application No. 2938139 Office Action May 24, 2017, 8 pages.
Chilean Patent Application No. 201601916, Office Action dated Mar. 2, 2018, 7 pages.
Japanese Patent Application No. 2016549035 English translation of Office Action dated Jun. 27, 2017, 3 pages.
Japanese Patent Application No. 2017212198 English translation of Office Action dated Dec. 12, 2017, 2 pages.
Chinese Patent Application No. 201410042716.8 First Office Action dated Jun. 20, 2016, 6 pages.
Chinese Patent Application No. 201410043148.3 English translation of First Office Action dated Apr. 26, 2018, 9 pages.
Chinese Patent Application No. 201611041095.7 English translation of First Office Action dated Jul. 30, 2018, 11 pages.
U.S. Appl. No. 15/596,884 Office Action dated Feb. 23, 2018, 34 pages.
U.S. Appl. No. 15/596,884 Office Action dated Jun. 28, 2017, 42 pages.
U.S. Appl. No. 15/596,884 Office Action dated Oct. 5, 2017, 38 pages.
U.S. Appl. No. 15/114,966 Office Action dated Dec. 29, 2017, 11 pages.
U.S. Appl. No. 15/115,203 Office Action dated May 16, 2018, 25 pages.
European Patent Application No. 14880785.2 extended Search and Opinion dated Oct. 10, 2017, 5 pages.
European Patent Application No. 14881067.4 Extended Search and Opinion dated Oct. 19, 2017, 13 pages.
Singapore Patent Application No. 11201606227T Search Report and Opinion dated Jun. 27, 2017, 9 pages.
PCT/CN2014/077046 English translation of International Search Report dated Oct. 9, 2014, 3 pages.
Chinese Patent Application No. 201410042716.8 First Office Action dated Jun. 20, 2016, with English Translation, 10 pages.
Chinese Patent Application No. 201410043148.3 First Office Action dated Apr. 26, 2016, with English Translation, 14 pages.
Korean Patent Application No. 10-2016-7022404 Notification of Reason for Refusal dated Feb. 16, 2017, with English Translation, 16 pages.
Japanese Patent Application No. 2016-549266 Notification of Reasons for Refusal dated Jul. 21, 2017, with English Translation, 7 pages.

\* cited by examiner

POWER ADAPTER, TERMINAL, AND METHOD FOR PROCESSING IMPEDANCE ANOMALIES IN CHARGING CIRCUIT

CROSS-REFERENCE TO RELATED APPLICATIONS

This application is a US national phase application based on International Application No. PCT/CN2015/070460, filed on Jan. 9, 2015, which is based on and claims priority to Chinese Patent Application No. 201410043148.3, filed on Jan. 28, 2014; No. 201410042716.8, filed on Jan. 28, 2014, the entire contents of which are incorporated herein by reference.

TECHNICAL FIELD

Embodiments of the present disclosure relate to the charging technical field, and more particularly, to a power adapter, a terminal and a method for processing an impedance anomaly of a charging loop.

BACKGROUND

Currently, batteries in most of electronic devices are coupled to external power adapters via charging interfaces of the electronic devices to be charged.

Phenomenon of an impedance anomaly of a charging loop often occurs during charging. There are various reasons resulting in the impedance anomaly, for example, a poor contact caused by not well inserting the charging interface, and a poor contact between a battery and a connector at each terminal of the battery due to dirt at the two terminals of the battery.

In a case that the impedance anomaly of the charging loop occurs, if the charging goes on, charging components (such as a battery, a power adapter, and a terminal) will be damaged, so that there are security risks. In the related art, the impedance anomaly of the charging loop cannot be detected and processed, so that the security during charging is poor.

SUMMARY

Embodiments of the present disclosure provide a power adapter, a terminal and a method for processing an impedance anomaly of a charging loop, so as to improve the security during charging.

In an embodiment, a terminal is provided. The terminal includes a battery and a charging interface, and is configured to form a charging loop with a power adapter via the charging interface to charge the battery. The terminal further includes: a communication component, configured to receive voltage indication information from the power adapter when the power adapter charges the terminal, in which the voltage indication information indicates an output voltage of the power adapter; a detection component, configured to detect an input voltage of the power adapter; and an anomaly processing component, configured to determine whether an impedance of the charging loop is abnormal according to a difference between the input voltage and the output voltage, and to control the charging loop to enter into a protected state if the impedance of the charging loop is abnormal.

In an embodiment, a power adapter is provided. The power adapter includes a power conversion component and a charging interface, and the power conversion component is configured to form a charging loop with a terminal via the charging interface to charge a battery of the terminal. The power adapter further includes: a detection component, a communication component and an anomaly processing component, in which, the detection component is configured to detect an output voltage of the power adapter when the power adapter charges the terminal; the communication component is configured to send voltage indication information to the terminal, the voltage indication information indicating the output voltage of the power adapter detected by the detection component; the communication component is configured to receive charging protection indication information from the terminal if the terminal determines that an impedance of the charging loop is abnormal based on a difference between an input voltage of the power adapter and the output voltage of the power adapter; and the anomaly processing component is configured to control the charging loop to enter into a protected state according to an indication of the charging protection indication information.

In an embodiment, a method for processing an impedance anomaly of a charging loop is provided. The method includes: receiving, by a terminal, voltage indication information from a power adapter when the power adapter charges the terminal, the voltage indication information indicating an output voltage of the power adapter; detecting, by a terminal, an input voltage of the power adapter; and determining, by a terminal, whether an impedance of the charging loop is abnormal according to a difference between the input voltage and the output voltage and controlling, by the terminal, the charging loop to enter into a protected state if the impedance of the charging loop is abnormal.

In an embodiment, a method for processing an impedance anomaly of a charging loop is provided. The method includes: detecting, by the power adapter, an output voltage of the power adapter when the power adapter charges the terminal; sending, by the power adapter, voltage indication information to the terminal, the voltage indication information indicating the output voltage of the power adapter detected by the power adapter; receiving, by the power adapter, charging protection indication information from the terminal if the terminal determines that an impedance of the charging loop is abnormal based on a difference between an input voltage of the power adapter and the output voltage of the power adapter; and controlling, by the power adapter, the charging loop to enter into a protected state according to an indication of the charging protection indication information.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For persons skilled in the art, other drawings may be obtained based on these drawings without any creative work.

DETAILED DESCRIPTION

The technical solutions in embodiments of the present disclosure are hereinafter described clearly and completely with reference to the accompanying drawings in embodiments of the present disclosure. It should be understood that, embodiments described herein are a part of embodiments of the present disclosure, but not all. Based on embodiments of the present disclosure, all other embodiments obtained by those skilled in the art without creative work should fall within the scope of the present disclosure.

Figure 1:
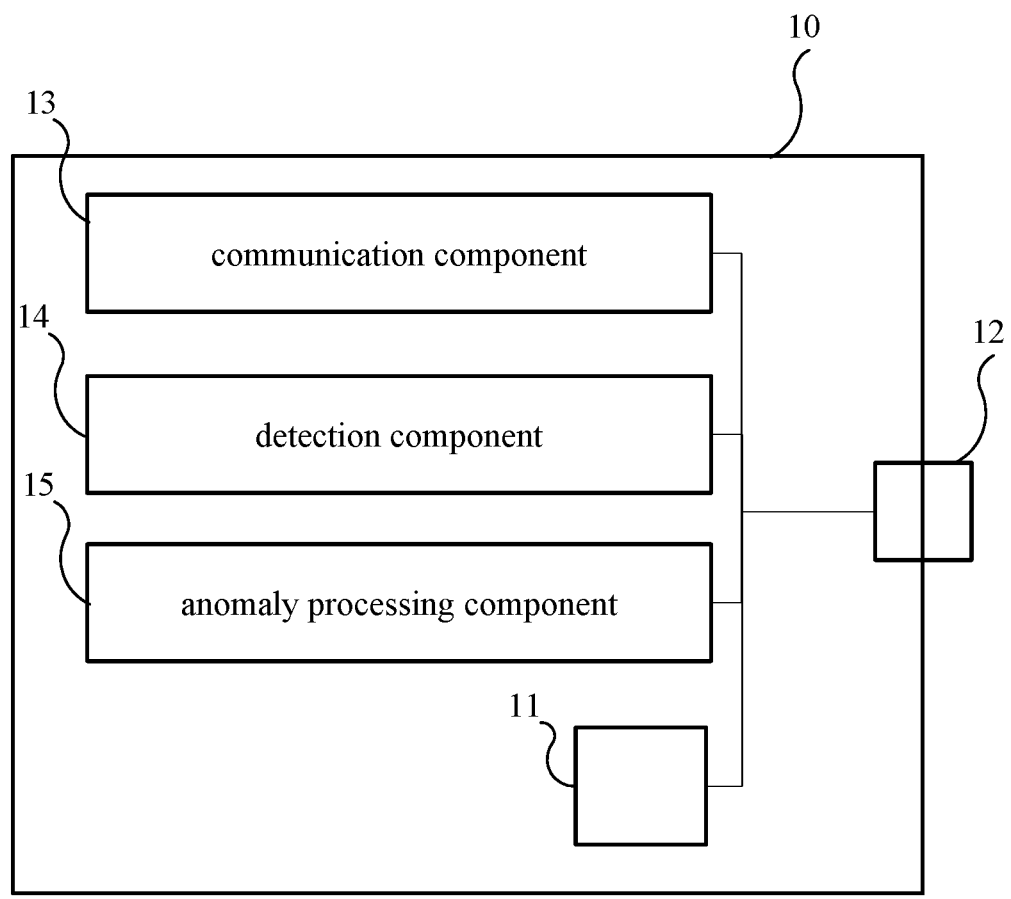
FIG. 1 is a schematic block diagram showing a terminal according to an embodiment of the present disclosure.

FIG. 1 is a schematic block diagram showing a terminal according to an embodiment of the present disclosure. The terminal 10 in FIG. 1 includes a battery 11 and a charging interface 12. The terminal 10 forms a charging loop with a power adapter via the charging interface 12 to charge the battery 11. The terminal 10 further includes: a communication component 13, a detection component 14 and an anomaly processing component 15.

The communication component 13 is configured to receive voltage indication information from the power adapter when the power adapter charges the terminal, in which the voltage indication information indicates an output voltage of the power adapter detected by the terminal.

The detection component 14 is configured to detect an input voltage of the power adapter.

The anomaly processing component 15 is configured to determine whether an impedance of the charging loop is abnormal according to a difference between the input voltage and the output voltage, and to control the charging loop to enter into a protected state if the impedance of the charging loop is abnormal.

In embodiments of the present disclosure, the terminal obtains the output voltage of the power adapter via the communication with the power adapter. The terminal determines whether the impedance of the charging loop is abnormal according to the difference between the output voltage of the power adapter and the input voltage of the power adapter detected by itself, and controls the charging loop to enter into the protected state if the impedance of the charging loop is abnormal, thereby improving the security during charging.

In at least one embodiment, the anomaly processing component 15 is configured to control the charging loop to enter into the protected state by performing one or more of the following operations of: reducing the input voltage of the power adapter; reducing an input current of the power adapter; and switching off the charging loop.

In an embodiment, the anomaly processing component 15 is configured to determine whether the impedance of the charging loop is abnormal according to the difference between the input voltage and the output voltage and to control the charging loop to enter into the protected state if the impedance of the charging loop is abnormal by performing the following operations of: determining a level of the impedance according to the difference between the input voltage and the output voltage of the power adapter; and controlling the charging loop to enter into a protected state corresponding to the level according to the level of the impedance.

For example, a correspondence between a level of the impedance and a difference between the input voltage and the output voltage of the power adapter may be set in advance. After the anomaly processing component 15 determines an actual difference between the input voltage of the power adapter and the output voltage of the power adapter, a level of the impedance corresponding to the actual difference may be found by using the above correspondence. Different levels of the impedance correspond to different protected states respectively. For example, the levels of the impedance include "light", "medium" and "heavy". If the level of the impedance is "light", it can control the charging loop to continue charging with a large current; if the level of the impedance is "medium", it can control the charging loop to charge with a small current; and if the level of the impedance is "heavy", it can control the charging loop to be switched off.

In at least one embodiment, a position where the output voltage of the power adapter is detected and a position where the input voltage of the power adapter is detected by the terminal are not be limited in embodiments of the present disclosure, and can be set according to different requirements.

For example, detection positions of the input voltage of the power adapter and the output voltage of the power adapter are located at two terminals of the charging interface respectively, and the impedance of the charging loop refers to an impedance of a circuit in the charging interface. The above detection positions of the input voltage of the power adapter and the output voltage of the power adapter being located respectively at two terminals of the charging interface refers to that, the position where the power adapter detects the output voltage and the position where the terminal detects the input voltage of the power adapter are close to the charging interface coupled to the power adapter and the terminal. If any of the power adapter and the terminal detects that a drop of voltage is abnormal, it may be determined that it is caused by an impedance anomaly of the circuit in the charging interface.

For another example, a detection position of the input voltage of the power adapter is located at two terminals of the battery, and the impedance of the charging loop refers to an impedance of a circuit from the power adapter to the battery of the terminal. Since the input current of the power adapter flows through each component within the terminal and reaches the two terminals of the battery eventually, the difference between the input voltage and the output voltage of the power adapter can indicate the impedance of the whole charging loop if the terminal detects the input voltage of the power adapter at the two terminals of the battery.

In an embodiment, the terminal 10 further includes an alarm device configured to generate an alarm signal if the impedance of the charging loop is abnormal. The alarm device can be a sound alarm device, or a lamp. Taking the impedance of the charging loop being the impedance of the circuit in the charging interface as an example, when the alarm device raises an alarm, it indicates that the charging interface contacts poorly and reminds a user to re-couple the charging interface between the power adapter and the terminal.

In an embodiment, the communication component 13 sends charging protection indication information to the power adapter if the impedance of the charging loop is abnormal, so as to instruct the power adapter to control the charging loop to enter into the protected state.

In embodiments of the present disclosure, if the impedance of the charging loop is abnormal, the terminal not only controls the charging loop to enter into the protected state actively, but also instructs the power adapter to control the charging loop to enter into the protected state. In this way, even if the anomaly processing component of the terminal is invalid and cannot control the charging loop to enter into the protected state, the charging loop still can be controlled by the power adapter to enter into the protected state, thereby further improving the security during charging.

In an embodiment, the charging interface 12 includes a power wire and a data wire. The terminal 10 is configured to form the charging loop with the power adapter via the power wire in the charging interface 12 to charge the battery 11; the communication component 13 is configured to receive the voltage indication information from the power adapter via the data wire in the charging interface 12 when the power adapter charges the terminal 10.

For example, the charging interface may be a Universal Serial Bus (USB) interface or a micro USB interface. The above power wire may be a power wire in the USB interface, for example, +5V power wire and −5V power wire; the above data wire may be a data wire in the USB interface, for example, D+ wire and D− wire.

Figure 2:
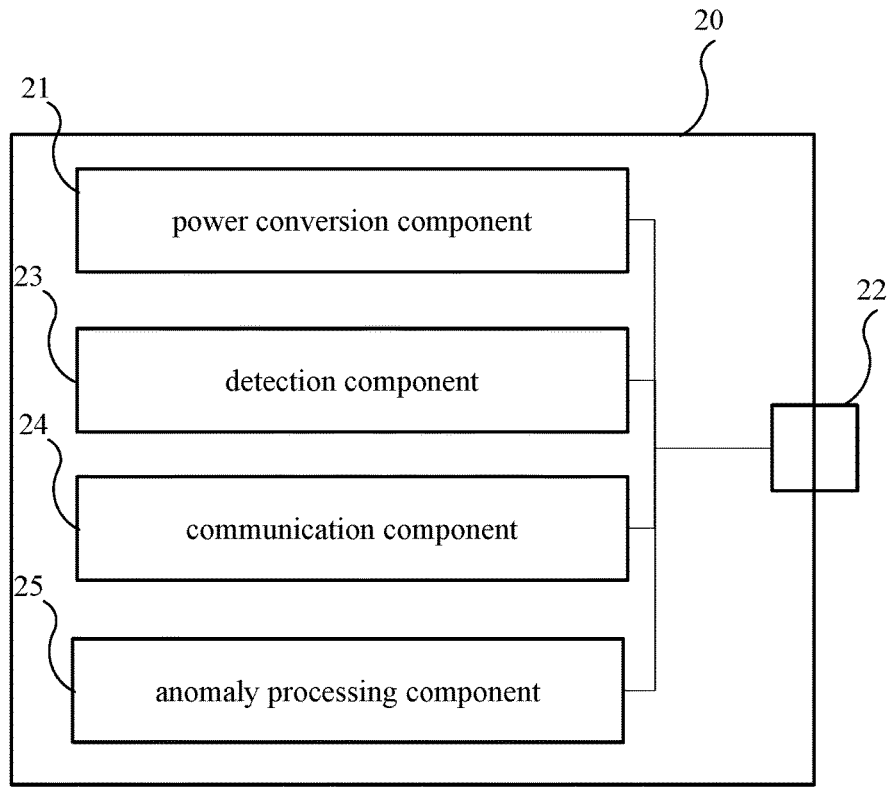
FIG. 2 is a schematic block diagram showing a power adapter according to an embodiment of the present disclosure.

FIG. 2 is a schematic block diagram showing a power adapter according to an embodiment of the present disclosure. The power adapter 20 in FIG. 2 includes a power conversion component 21 and a charging interface 22. The power conversion component 21 is configured to form a charging loop with a terminal via the charging interface 22 to charge a battery of the terminal. The power adapter 20 further includes: a detection component 23, a communication component 24 and an anomaly processing component 25.

The detection component 23 is configured to detect an output voltage of the power adapter when the power adapter 20 charges the terminal.

The communication component 24 is configured to send voltage indication information to the terminal, in which the voltage indication information indicates the output voltage of the power adapter detected by the detection component 23.

The communication component 24 is configured to receive charging protection indication information from the terminal if the terminal determines that an impedance of the charging loop is abnormal based on a difference between an input voltage of the power adapter 20 and the output voltage of the power adapter 20.

The anomaly processing component 25 is configured to control the charging loop to enter into a protected state according to an indication of the charging protection indication information.

In embodiments of the present disclosure, the power adapter communicates with the terminal during charging, and sends the output voltage of the power adapter detected by itself to the terminal, so that the terminal determines whether the impendence of the charging loop is abnormal according to the difference between the output voltage of the power adapter and the input voltage of the power adapter detected by itself. If the impendence of the charging loop is abnormal, the power adapter receives the charging protection indication information from the terminal and then controls the charging loop to enter into the protected state, thereby improving the security during charging.

In an embodiment, the charging interface 22 includes a power wire and a data wire. The power conversion component 21 is configured to form the charging loop with the terminal via the power wire in the charging interface 22 to charge the battery of the terminal; the communication component 24 is configured to send the voltage indication information to the terminal via the data wire in the charging interface 22.

For example, the charging interface may be a Universal Serial Bus (USB) interface or a micro USB interface. The above power wire may be a power wire in the USB interface, for example, +5V power wire and −5V power wire; the above data wire may be a data wire in the USB interface, for example, D+ wire and D− wire.

In at least one embodiment, a position where the power adapter detects the output voltage thereof and a position where the terminal detects the input voltage of the power adapter are not be limited in embodiments of the present disclosure, and may be set according to different requirements.

For example, detection positions of the input voltage of the power adapter and the output voltage of the power adapter are located at two terminals of the charging interface respectively, and the impedance of the charging loop refers to an impedance of a circuit in the charging interface. The above detection positions of the input voltage of the power adapter and the output voltage of the power adapter being located respectively at two terminals of the charging interface refers to that, the position where the power adapter detects the output voltage and the position where the terminal detects the input voltage of the power adapter are close to the charging interface coupled to the power adapter and the terminal. If any of the power adapter and the terminal detects that a drop of voltage is abnormal, it may be determined that it is caused by an impedance anomaly of the circuit in the charging interface.

For another example, a detection position of the input voltage of the power adapter is located at two terminals of the battery, and the impedance of the charging loop refers to an impedance of a circuit from the power adapter to the battery of the terminal. Since the input current of the power adapter flows through each component within the terminal and reaches the two terminals of the battery eventually, the difference between the input voltage and the output voltage of the power adapter may indicate whether the impedance of the whole charging loop is abnormal, if the terminal detects the input voltage of the power adapter at the two terminals of the battery.

In an embodiment, the power adapter 20 further includes an alarm device configured to generate an alarm signal if the impedance of the charging loop is abnormal. The alarm device can be a sound alarm device, or a lamp. Taking the impedance of the charging loop being the impedance of the circuit in the charging interface as an example, when the alarm device raises an alarm, it indicates that the charging interface has a poor contact and reminds a user to re-couple the charging interface between the power adapter and the terminal.

Figure 3:
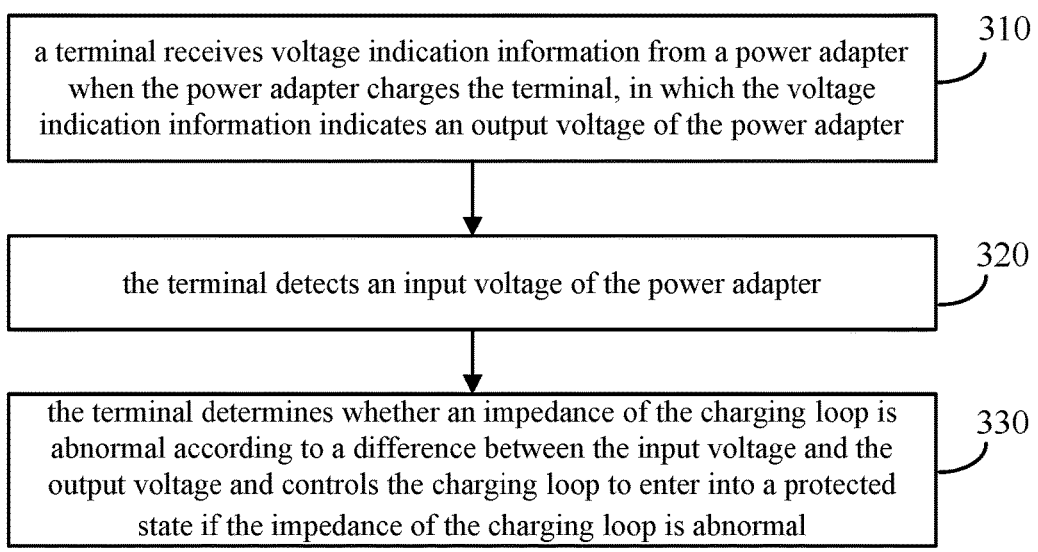
FIG. 3 is a schematic flow chart showing a method for processing an impedance anomaly of a charging loop according to an embodiment of the present disclosure.

FIG. 3 is a schematic flow chart showing a method for processing an impedance anomaly of a charging loop according to an embodiment of the present disclosure. In at least one embodiment, the method in FIG. 3 may be performed by the terminal shown in FIG. 1, which is not described in detail here to avoid duplication. The method in FIG. 3 includes the following.

In block 310, a terminal receives voltage indication information from a power adapter when the power adapter charges the terminal, in which the voltage indication information indicates an output voltage of the power adapter.

In block 320, the terminal detects an input voltage of the power adapter.

In block 330, the terminal determines whether an impedance of the charging loop is abnormal according to a difference between the input voltage and the output voltage and controls the charging loop to enter into a protected state if the impedance of the charging loop is abnormal.

In embodiments of the present disclosure, the terminal obtains the output voltage of the power adapter via the communication with the power adapter. The terminal determines whether the impedance of the charging loop is abnormal according to the difference between the output voltage of the power adapter and the input voltage of the power adapter detected by itself, and controls the charging loop to enter into the protected state if the impedance of the charging loop is abnormal, thereby improving the security during charging.

In an embodiment, the terminal determining whether the impedance of the charging loop is abnormal according to the difference between the input voltage and the output voltage and controlling the charging loop to enter into the protected state if the impedance of the charging loop is abnormal includes: the terminal determining a level of the impedance according to the difference; and the terminal controlling the charging loop to enter into a protected state corresponding to the level according to the level of the impedance.

In an embodiment, detection positions of the input voltage of the power adapter and the output voltage of the power adapter are located at two terminals of a charging interface respectively, and the impedance of the charging loop refers to an impedance of a circuit in the charging interface.

In an embodiment, a detection position of the input voltage of the power adapter is located at two terminals of a battery of the terminal, and the impedance of the charging loop refers to an impedance of a circuit from the power adapter to the battery of the terminal.

In an embodiment, the method in FIG. 3 further includes: generating by the terminal an alarm signal if the impedance of the charging loop is abnormal.

In an embodiment, the method in FIG. 3 further includes: sending by the terminal charging protection indication information to the power adapter if the impedance of the charging loop is abnormal, so as to instruct the power adapter to control the charging loop to enter into the protected state.

In an embodiment, the charging interface includes a power wire and a data wire, the power adapter charges the terminal via the power wire, the terminal receiving the voltage indication information from the power adapter includes: the terminal receiving the voltage indication information from the power adapter via the data wire in the charging interface.

Figure 4:
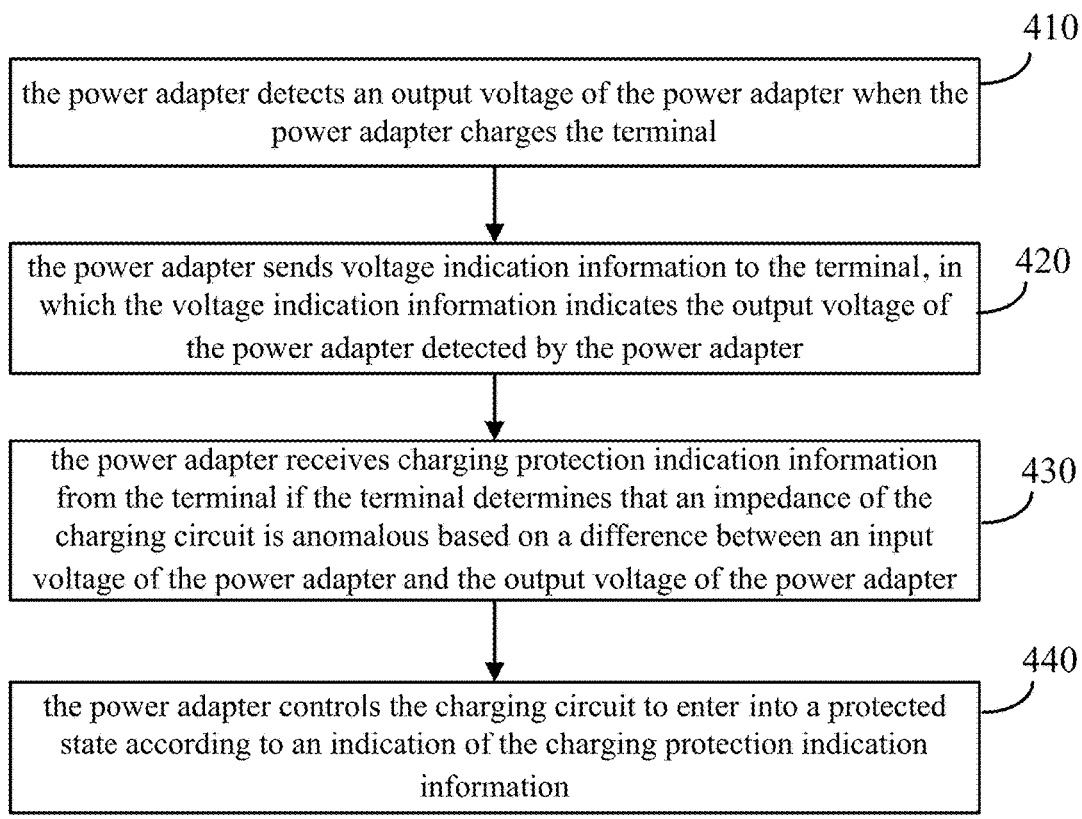
FIG. 4 is a schematic flow chart showing a method for processing an impedance anomaly of a charging loop according to an embodiment of the present disclosure.

FIG. 4 is a schematic flow chart showing a method for processing an impedance anomaly of a charging loop according to an embodiment of the present disclosure. In at least one embodiment, the method in FIG. 4 may be performed by the power adapter shown in FIG. 2, which is not described in detail here to avoid duplication. The method in FIG. 4 includes the following.

In block 410, the power adapter detects an output voltage of the power adapter when the power adapter charges the terminal.

In block 420, the power adapter sends voltage indication information to the terminal, in which the voltage indication information indicates the output voltage of the power adapter detected by the power adapter.

In block 430, the power adapter receives charging protection indication information from the terminal if the terminal determines that an impedance of the charging loop is abnormal based on a difference between an input voltage of the power adapter and the output voltage of the power adapter.

In block 440, the power adapter controls the charging loop to enter into a protected state according to an indication of the charging protection indication information.

In embodiments of the present disclosure, the power adapter communicates with the terminal during charging, and sends the output voltage of the power adapter detected by itself to the terminal, so that the terminal determines whether the impendence of the charging loop is abnormal according to the difference between the output voltage of the power adapter and the input voltage of the power adapter detected by itself. If the impendence of the charging loop is abnormal, the power adapter receives the charging protection indication information from the terminal and then controls the charging loop to enter into the protected state, thereby improving the security during charging.

In an embodiment, the charging interface includes a power wire and a data wire, and the power adapter charges the terminal via the power wire in the charging interface; the power adapter sending the voltage indication information to the terminal includes: the power adapter sending the voltage indication information to the terminal via the data wire in the charging interface.

In an embodiment, detection positions of the input voltage of the power adapter and the output voltage of the power adapter are located at two terminals of the charging interface respectively, and the impedance of the charging loop refers to an impedance of a circuit in the charging interface.

In an embodiment, a detection position of the input voltage of the power adapter is located at two terminals of a battery of the terminal, and the impedance of the charging loop refers to an impedance of a circuit from the power adapter to the battery of the terminal.

In an embodiment, the method in FIG. 4 further includes: generating an alarm signal if the impedance of the charging loop is abnormal.

Those skilled in the art may be aware that, in combination with the examples described in the embodiments disclosed in this specification, units and algorithm steps can be implemented by electronic hardware, or a combination of computer software and electronic hardware. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It would be appreciated by those skilled in the art that, for the purpose of simplification convenience of description, concerning the specific working process of the above system, device and unit as described above, reference is made to the method embodiments of the present disclosure, which will not be elaborated herein.

In several embodiments provided in the application, it should be understood that the disclosed system, device and method can be realized by other manners. For example, the above-described embodiments are only exemplary; for example, the division of said unit is only a logic function division; there may be additional dividing manners during the actual implementation. For example, multiple units or components may be combined or integrated into another system, or some features can be ignored, or not implemented. Another point, the displayed or discussed mutual coupling or direct coupling or communication connection may be indirect coupling or communication connection of devices or units via some interfaces, in electronic, mechanical, or other forms.

Said unit described as a separation part may be or may not be separated physically; the part displayed as a unit may be or may not be a physical unit, namely it can be located in one place, or can be distributed to multiple network units. Part or all of the units can be selected according to actual needs to achieve the purpose of the embodiment.

In addition, all functional units in the embodiments of the invention can be integrated in one processing unit, or each unit exists individually in physical form, or two or more units are integrated in one unit.

If said function is realized in the form of software function unit and sold or used as an independent product, it can be stored in a computer readable storage medium. With such an understanding, the technical solution of the invention substantially or its portion that contributes to the prior art or a portion of the technical solution may embody in the form of a computer software product which is stored in a memory media, including a plurality of instructions such that a computer (may be a personal computer, a server, or a network device, etc.) executes all or some steps of the methods described in each of all the embodiments. And the previously mentioned memory media include such media capable of storing program codes as USB flash disk, portable hard drive, read-only memory (ROM), random access memory (RAM), floppy disk or compact disk.

The above descriptions are only specific embodiments of the invention, but not intended to limit the protection scope of the invention. The variation or replacement easily thought of by those of skill in the art within the technical scope disclosed by the invention, shall fall within the protection scope of the invention. Therefore, the protection scope of the invention shall be determined with reference to the protection scope of the claims.

What is claimed is:

1. A terminal comprising a battery and a charging interface, and the terminal being configured to form a charging loop with a power adapter via the charging interface to charge the battery, wherein, the terminal further comprises:
    a communication component, configured to receive voltage indication information from the power adapter when the power adapter charges the terminal, the voltage indication information indicating an output voltage of the power adapter;
    a detection component, configured to detect an input voltage of the power adapter; and
    an anomaly processing component, configured to:
        determine whether an impedance of the charging loop is abnormal according to a difference between the input voltage and the output voltage,
        determine a level of the impedance according to the difference,
        control, according to the level of the impedance, the charging loop to enter into a protected state if the impedance of the charging loop is abnormal, the protected state corresponding to the level of the impedance.

2. The terminal according to claim 1, wherein, detection positions of the input voltage of the power adapter and the output voltage of the power adapter are located at two terminals of the charging interface respectively, and the impedance of the charging loop refers to an impedance of a circuit in the charging interface.

3. The terminal according to claim 1, wherein, a detection position of the input voltage of the power adapter is located at two terminals of the battery of the terminal, and the impedance of the charging loop refers to an impedance of a circuit from the power adapter to the battery of the terminal.

4. The terminal according to claim 1, further comprising:
    an alarm device, configured to generate an alarm signal if the impedance of the charging loop is abnormal.

5. The terminal according to claim 1, wherein, the communication component is configured to send charging protection indication information to the power adapter if the impedance of the charging loop is abnormal, so as to instruct the power adapter to control the charging loop to enter into the protected state.

6. The terminal according to claim 1, wherein, the charging interface comprises a power wire and a data wire,
    the terminal is configured to form the charging loop with the power adapter via the power wire in the charging interface to charge the battery;
    the communication component is configured to receive the voltage indication information from the power adapter via the data wire in the charging interface.

7. A power adapter comprising a power conversion component and a charging interface, the power conversion component being configured to form a charging loop with a terminal via the charging interface to charge a battery of the terminal, wherein, the power adapter further comprises: a detection component, a communication component and an anomaly processing component, wherein
    the detection component is configured to detect an output voltage of the power adapter when the power adapter charges the terminal;
    the communication component is configured to send voltage indication information to the terminal, the voltage indication information indicating the output voltage of the power adapter detected by the detection component,
    and to receive charging protection indication information from the terminal if the terminal determines that an impedance of the charging loop is abnormal based on a difference between an input voltage of the power adapter and the output voltage of the power adapter; and
    the anomaly processing component is configured to control the charging loop to enter into a protected state according to an indication of the charging protection indication information the indication of the charging protection indicative information indicating a protection state corresponding to a level of the impedance determined according to the difference.

8. The power adapter according to claim 7, wherein, the charging interface comprises a power wire and a data wire,
    the power conversion component is configured to form the charging loop with the terminal via the power wire in the charging interface to charge the battery of the terminal;
    the communication component is configured to send the voltage indication information to the terminal via the data wire in the charging interface.

9. The power adapter according to claim 7, wherein, detection positions of the input voltage of the power adapter and the output voltage of the power adapter are located at two terminals of the charging interface respectively, and the impedance of the charging loop refers to an impedance of a circuit in the charging interface.

10. The power adapter according to claim 7, wherein, a detection position of the input voltage of the power adapter is located at two terminals of the battery of the terminal, and the impedance of the charging loop refers to an impedance of a circuit from the power adapter to the battery of the terminal.

11. The power adapter according to claim 7, further comprising:
an alarm device, configured to generate an alarm signal if the impedance of the charging loop is abnormal.

12. A method for processing an impedance anomaly of a charging loop, comprising:
receiving, by a terminal, voltage indication information from a power adapter when the power adapter charges the terminal, the voltage indication information indicating an output voltage of the power adapter;
detecting, by the terminal, an input voltage of the power adapter; and
determining, by the terminal, whether an impedance of the charging loop is abnormal according to a difference between the input voltage and the output voltage,
determining, by the terminal, a level of the impedance according to the difference; and
controlling, by the terminal and according to the level of impedance, the charging loop to enter into a protected state corresponding to the level of impedance if the impedance of the charging loop is abnormal.

13. The method according to claim 12, wherein, detection positions of the input voltage of the power adapter and the output voltage of the power adapter are located at two terminals of a charging interface respectively, and the impedance of the charging loop refers to an impedance of a circuit in the charging interface.

14. The method according to claim 13, wherein, the charging interface comprises a power wire and a data wire, the power adapter charges the terminal via the power wire,
receiving, by the terminal, the voltage indication information from the power adapter, comprises:
receiving, by the terminal, the voltage indication information from the power adapter via the data wire in the charging interface.

15. The method according to claim 12, wherein, a detection position of the input voltage of the power adapter is located at two terminals of a battery of the terminal, and the impedance of the charging loop refers to an impedance of a circuit from the power adapter to the battery of the terminal.

16. The method according to claim 12, further comprising:
generating, by the terminal, an alarm signal if the impedance of the charging loop is abnormal.

17. The method according to claim 12, further comprising:
sending, by the terminal, charging protection indication information to the power adapter if the impedance of the charging loop is abnormal, so as to instruct the power adapter to control the charging loop to enter into the protected state.

18. A method for processing an impedance anomaly of a charging loop, comprising:
detecting, by the power adapter, an output voltage of the power adapter when the power adapter charges the terminal;
sending, by the power adapter, voltage indication information to the terminal, the voltage indication information indicating the output voltage of the power adapter detected by the power adapter;
receiving, by the power adapter, charging protection indication information from the terminal if the terminal determines that an impedance of the charging loop is abnormal based on a difference between an input voltage of the power adapter and the output voltage of the power adapter; and
controlling, by the power adapter, the charging loop to enter into a protected state according to an indication of the charging protection indication information, the indication of the charging protection indicative information indicating a protection state corresponding to a level of the impedance determined according to the difference.

19. The method according to claim 18, wherein, a charging interface comprises a power wire and a data wire, the power adapter charges the terminal via the power wire in the charging interface,
sending, by the power adapter, the voltage indication information to the terminal, comprises:
sending, by the power adapter, the voltage indication information to the terminal via the data wire in the charging interface.

20. The method according to claim 18, wherein, detection positions of the input voltage of the power adapter and the output voltage of the power adapter are located at two terminals of the charging interface respectively, and the impedance of the charging loop refers to an impedance of a circuit in the charging interface.

21. The method according to claim 18, wherein, a detection position of the input voltage of the power adapter is located at two terminals of a battery of the terminal, and the impedance of the charging loop refers to an impedance of a circuit from the power adapter to the battery of the terminal.

22. The method according to claim 18, further comprising:
generating an alarm signal if the impedance of the charging loop is abnormal.

* * * * *